United States Patent
Kunik et al.

(10) Patent No.: US 10,810,729 B2
(45) Date of Patent: Oct. 20, 2020

(54) IMAGE-BASED INSPECTION FOR PHYSICAL DEGRADATION OF AN AIR DATA PROBE

(71) Applicant: Rosemount Aerospace Inc., Burnsville, MN (US)

(72) Inventors: William Kunik, Lakeville, MN (US); Brian Brent Naslund, Chanhassen, MN (US); Scott J. Braun, Lakeville, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 0 days.

(21) Appl. No.: 16/233,592

(22) Filed: Dec. 27, 2018

(65) Prior Publication Data

US 2020/0211175 A1 Jul. 2, 2020

(51) Int. Cl.

| G06T 7/00 | (2017.01) |
|---|---|
| G06T 7/13 | (2017.01) |
| G06T 7/70 | (2017.01) |
| G01B 11/16 | (2006.01) |
| G01N 17/00 | (2006.01) |
| G01N 21/88 | (2006.01) |
| H04N 5/232 | (2006.01) |
| H04N 5/262 | (2006.01) |
| G01P 5/165 | (2006.01) |

(52) U.S. Cl.
CPC ............ *G06T 7/0004* (2013.01); *G01B 11/16* (2013.01); *G01N 17/00* (2013.01); *G01N 21/8851* (2013.01); *G06T 7/13* (2017.01); *G06T 7/70* (2017.01); *H04N 5/23222* (2013.01); *H04N 5/2628* (2013.01); *G01P 5/165* (2013.01)

(58) Field of Classification Search
CPC .................................................... G06T 7/0004
USPC ......................................................... 348/128
See application file for complete search history.

(56) References Cited

U.S. PATENT DOCUMENTS

| 7,609,874 B2 | 10/2009 | Eswara et al. | |
|---|---|---|---|
| 2002/0001403 A1 | 1/2002 | Kikuchi | |
| 2007/0127821 A1 | 6/2007 | Katsuyama | |
| 2016/0327448 A1* | 11/2016 | Cain | G01P 5/26 |
| 2018/0190132 A1 | 7/2018 | Cronkhite et al. | |
| 2018/0275085 A1* | 9/2018 | Fok | H05B 3/44 |

(Continued)

OTHER PUBLICATIONS

Aeroprobe Flight Characterization (Year: 2018).*

(Continued)

*Primary Examiner* — Eileen M Adams
*Assistant Examiner* — Daniel T Tekle
(74) *Attorney, Agent, or Firm* — Kinney & Lange, P.A.

(57) ABSTRACT

Inspecting an air data probe for physical degradation includes generating a silhouette of the air data probe based on an identification of the air data probe to be inspected. The silhouette is simultaneously displayed with an image of the air data probe produced by a camera, and the displayed image of the air data probe is caused to conform to the silhouette on the display. An image of the air data probe is captured while the displayed image of the air data probe conforms to the silhouette on the display. The captured image is analyzed to identify physical degradation of the air data probe. A maintenance recommendation for the air data probe is generated based on the identified physical degradation.

17 Claims, 5 Drawing Sheets

(56) References Cited

U.S. PATENT DOCUMENTS

2018/0322714 A1   11/2018   Gennotte

OTHER PUBLICATIONS

Igoe, D. and Parisi, A.V., "Characterization of the Corrsion of Iron Using a Smartphone Camera", dated Aug. 21, 2015, Instrumentation Science & Technology, 18 pages.
Extended European Search Report for European Patent Application No. 19218977.7, dated Jun. 9, 2020, eight pages.

* cited by examiner

IMAGE-BASED INSPECTION FOR PHYSICAL DEGRADATION OF AN AIR DATA PROBE

BACKGROUND

The present disclosure relates generally to inspection of air data probes, and more particularly to image-based analysis for identifying physical degradation of air data probes during inspection.

Modern aircraft often incorporate air data systems that calculate air data outputs based on measured parameters collected from various sensors positioned about the aircraft. For instance, many air data systems utilize air data probes that measure pneumatic pressure of oncoming airflow about the aircraft exterior to generate aircraft air data outputs, such as airspeed, altitude, angle of attack, angle of sideslip, or other aircraft air data parameters. Pressure measurements and/or corresponding air data parameter outputs are often compensated for aircraft aerodynamic and installation position effects to produce highly accurate air data outputs.

To achieve this high level of accuracy, the physical condition of the air data probe is typically verified against stringent condition criteria. That is, physical degradation of the probe resulting from deformation (e.g., dents, dings, bends, creases, or other deformation) as well as physical changes to the probe surface resulting from, e.g., corrosion due to environmental exposure, can alter the flow of air across the air data probe, thereby negatively impacting accuracy of the air data parameter outputs. As such, it is important that air data probes satisfy the stringent physical condition criteria not only when certified as new production on an aircraft, but also throughout the service life of the air data probe.

Traditionally, inspection of air data probes for the presence of performance-affecting physical degradation (e.g., physical deformation, corrosion, or other physical degradation) is performed via manual inspection of a technician during scheduled aircraft maintenance events. Such manual inspection may typically involve a tactile inspection of the probe for surface wear, as well as a visual comparison of the appearance of the outer surface of the probe with images included in, e.g., an aircraft maintenance manual for evidence of unacceptable corrosion. Such manual inspections, however, can often be subjective in nature, thereby resulting in customer frustration due to inconsistency of application of the acceptability criteria.

SUMMARY

In one example, a method of inspecting an air data probe for physical degradation includes providing an identification of the air data probe to be inspected. The method further includes generating a silhouette of the air data probe based on the identification and simultaneously displaying, on a display, the silhouette and an image of the air data probe produced by a camera. The method further includes causing the displayed image of the air data probe to conform to the silhouette on the display, capturing an image of the air data probe while the displayed image of the air data probe conforms to the silhouette on the display, and analyzing the captured image to identify physical degradation of the air data probe. The method further includes generating, based on the identified physical degradation of the air data probe, a maintenance recommendation for the air data probe, and outputting the maintenance recommendation.

In another example, a system for inspecting an air data probe for physical degradation includes a camera, a display device, one or more processors, and computer-readable memory. The computer-readable memory is encoded with instructions that, when executed by the one or more processors, cause the system to generate a silhouette of the air data probe and simultaneously display, on the display device, the silhouette and an image of the air data probe produced by the camera. The computer-readable memory is further encoded with instructions that, when executed by the one or more processors, cause the system to capture an image of the air data probe while the displayed image of the air data probe conforms to the silhouette on the display device, and analyze the captured image to identify physical degradation of the air data probe. The computer-readable memory is further encoded with instructions that, when executed by the one or more processors, cause the system to generate, based on the identified physical degradation of the air data probe, a maintenance recommendation for the air data probe, and output the maintenance recommendation.

DETAILED DESCRIPTION

As described herein, a system for inspecting an air data probe utilizes image-based analysis techniques to identify physical degradation of the probe. A silhouette (e.g., an outline, a profile, or other silhouette) corresponding to known dimensions of the air data probe is simultaneously displayed with a field of view of a camera to help guide the technician to capture an image of the probe at a defined size, location, and orientation within the field of view of the camera. That is, the camera and the probe are moved relative to one another and/or a field of view of the camera is adjusted (e.g., zoomed in or out) until the image of the air data probe produced by the camera conforms to the silhouette of the probe on the display. An image of the air data probe is captured while the displayed image of the probe conforms to the silhouette.

The captured image is analyzed via image processing techniques to identify physical degradation of the probe, such as physical deformation of air data ports (e.g., a flared or otherwise deformed pitot pressure port, a deformed static pressure port, or other physical deformation of air data ports), physical deformation of other regions of the probe (e.g., dents, scratches, bends, or other deformation of any one or more portions of the probe), or corrosion that can manifest as, e.g., one or more of a change in contrast, shade, color, or surface pattern of the air data probe. In some examples, multiple images are captured from various relative orientations of the probe and camera (e.g., a top view, a bottom view, a front view, or other views) and utilized to identify, e.g., asymmetry of corrosion that can affect performance of the probe to produce accurate measurements of pressure of an oncoming airflow about an aircraft exterior. The system can produce a maintenance recommendation for the probe based on the image analysis, such as a recommendation for further inspection, a recommendation for removal of the probe, a recommendation for repair of the probe, or a recommendation for replacement of the probe. Accordingly, the system described herein can provide a maintenance recommendation for an air data probe that is based on image-based analysis techniques, thereby increasing uniformity of the application of degradation criteria.

Figure 1:
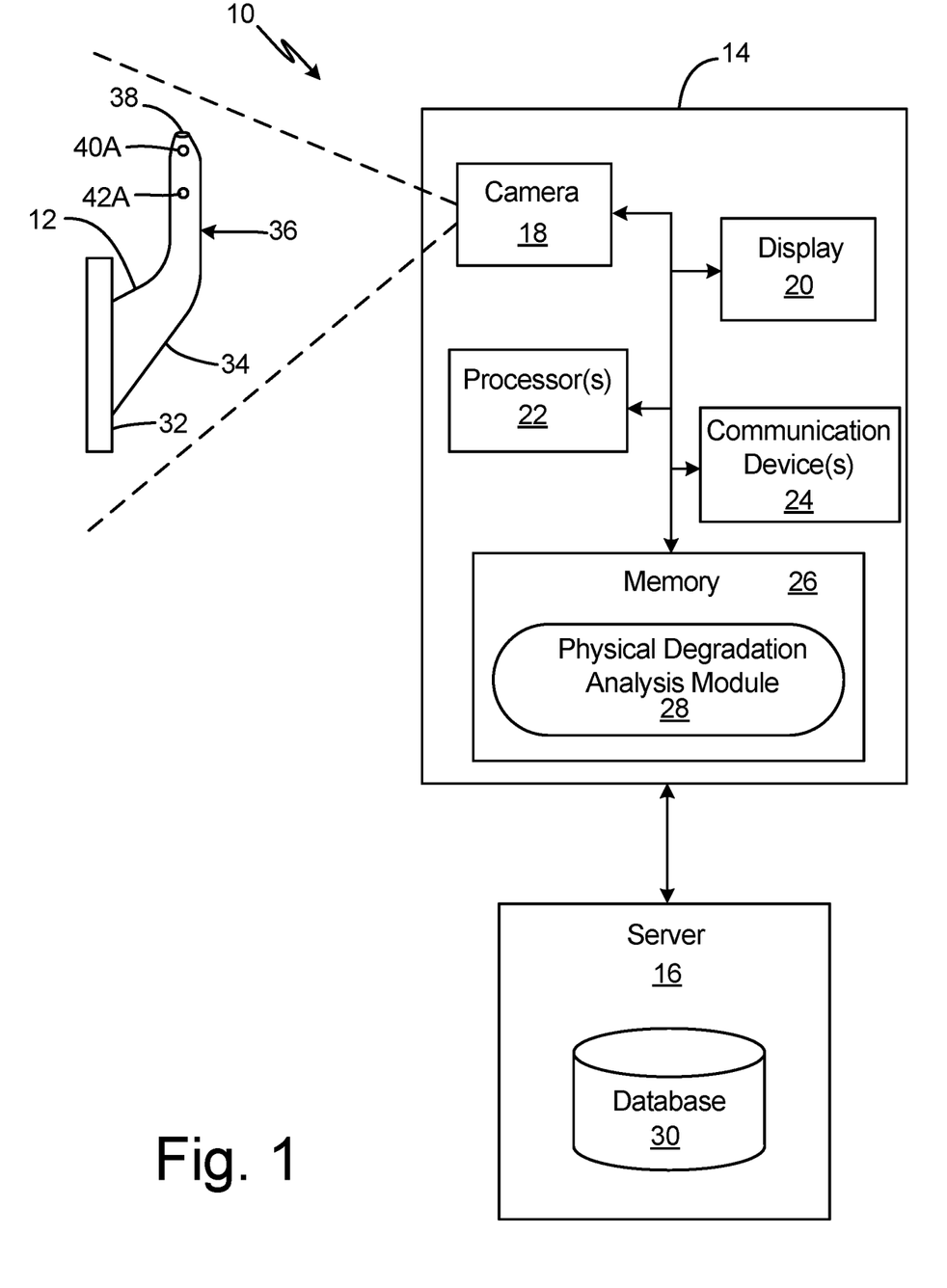
FIG. 1 is a schematic block diagram of a system for inspecting an air data probe for physical degradation.

FIG. 1 is a schematic block diagram of system 10 for inspecting air data probe 12 for physical degradation. System 10 includes inspection device 14 and server 16. Inspection device 14 includes camera 18, display device 20, processor(s) 22, communication device(s) 24, and computer-readable memory 26. Computer-readable memory 26 includes physical degradation analysis module 28. Server 16 includes database 30.

Air data probe 12, in the example of FIG. 1, is a pitot-static probe having base plate 32, strut 34, and barrel portion 36. Barrel portion 36 includes pitot pressure port 38 at a forward tip of barrel portion 36, static pressure port 40A aft of the tip, and static pressure port 42A aft of static pressure port 40A. Though not illustrated in FIG. 1, barrel portion 36 also includes a third static pressure port opposite static pressure port 40A and a fourth static pressure port opposite static pressure port 40B (each illustrated in FIG. 4B).

Base plate 32 is configured to mount air data probe 12 to an exterior of an aircraft, such that barrel portion 36 extends, via strut 34, into an oncoming airflow about the exterior of the aircraft. Pitot pressure port 38 is pneumatically connected to a pressure sensor, such as within an electronics housing (not illustrated), to measure a pitot (or total) pressure of the oncoming airflow. Each of static pressure ports 40A and 42A (as well as static pressure ports opposite ports 40A and 42A) are connected to pressure sensors (e.g., within the electronics housing) to measure static pressure of the oncoming airflow. Measured pitot and static pressures from air data probe 12 are utilized by an air data system or other consuming system for generation of aircraft air data parameters, such as airspeed, altitude, angle of attack, angle of sideslip, or other air data parameters. Though air data probe 12 is illustrated and described herein as a pitot-static probe, it should be understood that aspects of this disclosure are not so limited. For instance, air data probe 12 can be a pitot probe (e.g., without including static pressure ports) or other air data probe configured to be mounted to an exterior of an aircraft and exposed to exterior environmental conditions during operation of the aircraft, such as a total air temperature (TAT) probe, an angle of attack vane, a flush static pressure port, a multi-function air data probe that combines one or more air data measurements into a single line-replaceable unit (LRU), or other air data probe.

Physical degradation of air data probe 12, such as physical deformation of one or more of pitot pressure port 38 and static pressure ports 40A and 42A, can affect the pressure measurements obtained via the ports, thereby decreasing the accuracy of air data parameter outputs based on the pressure measurements. Similarly, the presence of corrosion on air data probe 12 at an area proximate and/or within pitot pressure port 38, and/or within an area proximate the pressure sensing ports, such as an area extending from pitot pressure port 38 to a location aft of static pressure port 42A (e.g., within a threshold distance from static pressure port 42A, such as one inch aft of pressure port 42A or other distances), can affect airflow over air data probe 12 and the resulting pressure measurements obtained via the ports. Accordingly, periodic inspections for physical degradation throughout a service life of air data probe 12 are important.

As described herein, inspection device 14 utilizes image-based analysis of an image of at least a portion of air data probe 12 to identify physical degradation of air data probe 12. Examples of inspection device 14 include electronic devices, such as a smartphone, a tablet computer, a digital camera, or other devices having a camera and integrated display. In other examples, one or more components of inspection device 14 can be distributed among multiple devices that are operatively connected (e.g., communicatively and/or electrically connected) to operate in accordance with techniques attributed herein to inspection device 14. For instance, inspection device 14 can take the form of a camera device that is operatively connected to a separate display device.

Camera 18 includes optical and electrical components, such as one or more lenses and image sensors configured to capture still and/or moving images within a field of view of camera 18. Display 20 can be a liquid crystal display (LCD), a light emitting diode (LED) display, an organic light emitting diode (OLED) display, an active matrix organic light emitting diode (AMOLED) display, or other type of display device capable of displaying graphical information to a user. In some examples, display 20 is a touch-sensitive display configured to present a graphical user interface (GUI) having one or more graphical control elements and to receive user input in the form of gestures to enable a user to interact with system 10.

Inspection device 14, as illustrated in FIG. 1, also includes one or more processors 22, one or more communication devices 24, and computer-readable memory 26. Processor(s) 22 can be configured to implement functionality and/or process instructions for execution within inspection device 14. For instance, processor(s) 22 can be capable of processing instructions stored in computer-readable memory 26, such as to execute software or other applications encoded as instructions stored in computer-readable memory 26 (e.g., physical degradation analysis module 28). Examples of processor(s) 22 include any one or more of a microprocessor, a digital signal processor (DSP), an application specific integrated circuit (ASIC), a field-programmable gate array (FPGA), or other equivalent discrete or integrated logic circuitry.

Computer-readable memory 26 can include volatile memory, such as random access memories (RAM), dynamic random access memories (DRAM), static random access memories (SRAM), and other forms of volatile memory. Computer-readable memory 26 can also include non-volatile memory, such as magnetic hard discs, optical discs, flash memories, or forms of electrically programmable memories (EPROM) or electrically erasable and programmable (EEPROM) memories. Computer-readable memory 26 can be used to store program instructions for execution by processor(s) 22. For instance, computer-readable memory 26 can be used by software or applications running on inspection device 14 (e.g., physical degradation analysis module 28) to temporarily store information during program execution. In some examples, computer-readable memory 26 can include a non-transitory medium. The term "non-transitory" can indicate that the storage medium is not embodied in a carrier wave or a propagated signal. In certain examples, a non-transitory storage medium can store data that can, over time, change (e.g., in RAM or cache).

Inspection device 14 utilizes communication device(s) 24 to communicate with external devices via wired or wireless connections, or both. For instance, inspection device 14 can utilize communication device(s) 24 to send and receive data with server 16, as is further described below. Communication device(s) 24 can be a network interface card, such as an Ethernet card, an optical transceiver, a radio frequency transceiver, a Bluetooth, 3G, 4G, Long-Term-Evolution (LTE), or WiFi transceiver, or any other type of device that can send and receive wired and/or wireless data.

Server 16 is communicatively coupled to send and receive data with inspection device 14 via one or more wired or wireless connections. Server 16, as illustrated in FIG. 1, can store database 30, though in other examples, database 30 can be remote from and accessible by server 16. Database 30 stores information associating identifiers of air data probes (e.g., probe model numbers, aircraft type, or other identifiers of air data probes) with physical dimensions of a plurality of air data probes according to the identifiers. Database 30 can be, e.g., a relational database, a hierarchical database, an object-oriented database, a multi-dimensional database, or other type of physical or virtual data store configured to organize data for later retrieval.

In operation, inspection device 14 utilizes image-based analysis techniques to identify physical degradation of air data probe 12, as is further described below. Physical degradation analysis module 28 produces a silhouette of air data probe 12 received from server 16 or determined based on dimensions of air data probe 12 received from server 16 via database 30. The silhouette can be, e.g., an outline, a profile, or other graphical representation of physical dimensions of at least a portion of air data probe 12. Inspection device 14 simultaneously displays the silhouette and an image of a field of view of camera 18 on display 20, such as by graphically overlaying the silhouette on the image of the field of view of camera 18 provided at display 20. A technician or other user causes an image of air data probe 12 produced by camera 18 to conform to the silhouette, such as by moving one or more of air data probe 12 and camera 18 to bring air data probe 12 within the field of view of camera 18 and to adjust a location, orientation, and/or size of the displayed image of air data probe 12 in the field of view of camera 18 to conform to the silhouette (e.g., cause the outer dimensions of the displayed image of air data probe 12 to match the silhouette). Camera 18, e.g., actuated by the technician, captures an image of air data probe 12 while the displayed image of air data probe 12 conforms to the silhouette on display 20. Physical degradation analysis module 28 analyzes the captured image to identify physical degradation of air data probe 12 and generates a maintenance recommendation based on the analysis, as is further described below.

Accordingly, system 10 implementing techniques of this disclosure analyzes a captured image of air data probe 12 to identify physical degradation, such as corrosion or physical deformation of air data probe 12. System 10 can provide a maintenance recommendation for an air data probe that is based on the image-based analysis techniques, thereby increasing uniformity of the application of degradation criteria.

Figure 2:
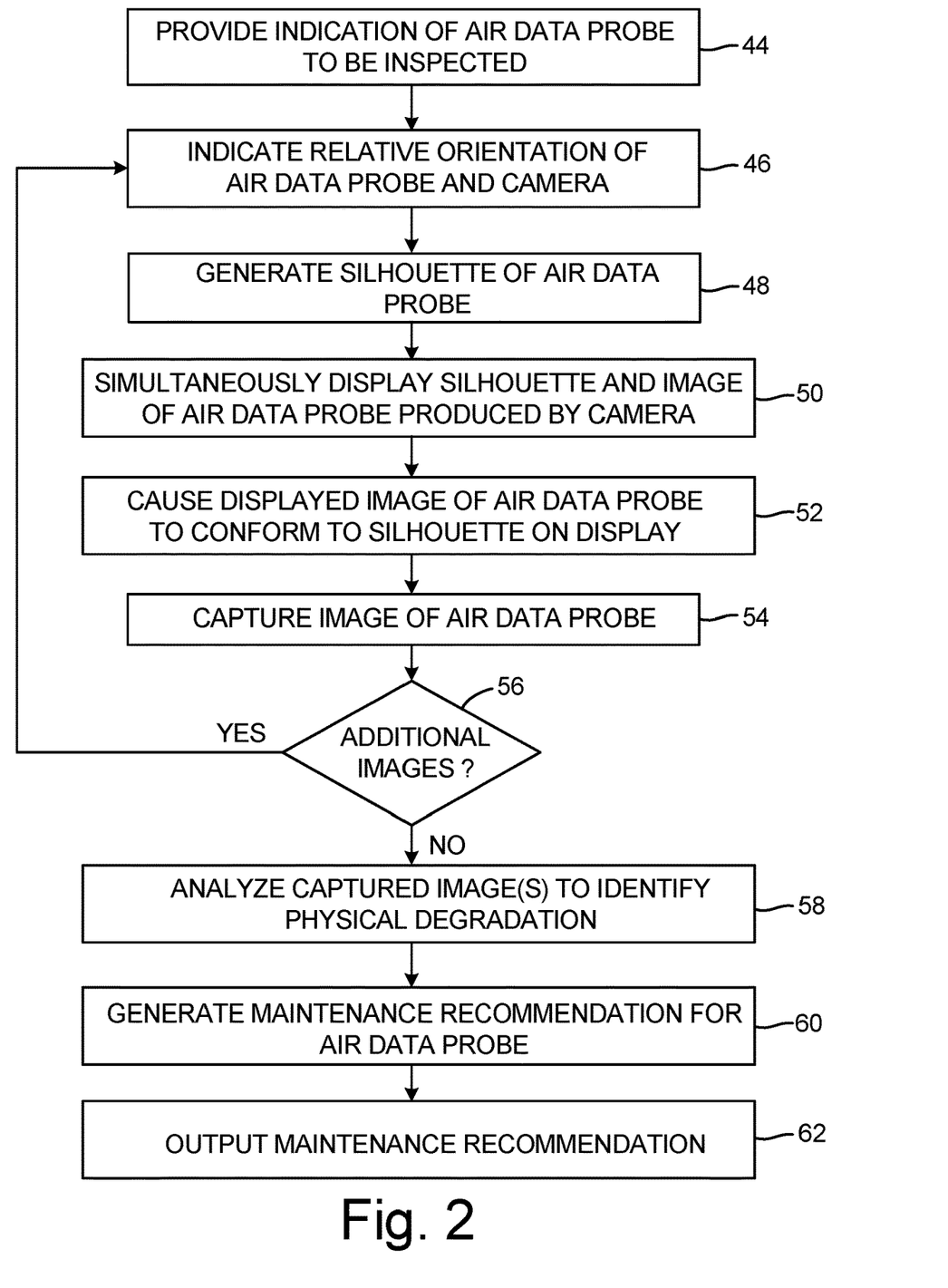
FIG. 2 is a flow diagram illustrating example operations for inspecting an air data probe for physical degradation.

FIG. 2 is a flow diagram illustrating example operations 44, 46, 48, 50, 52, 54, 56, 58, 60, and 62 for inspecting an air data probe for physical degradation. Any one or more of the example operations of FIG. 2 can be performed while the air data probe to be inspected is mounted on an aircraft (e.g., during a scheduled maintenance event) or not mounted on the aircraft (e.g., while the probe is located at a repair center or otherwise removed from the aircraft). For purposes of clarity and ease of discussion, the example operations of FIG. 2 are described below with respect to system 10 of FIG. 1.

An identification of an air data probe to be inspected is provided (Step 44). For example, inspection device 14 can present a graphical user interface (GUI) at display 20 (e.g., a touch-sensitive display) that prompts a user, such as an aircraft maintenance technician, to provide an identification of the air data probe to be inspected (e.g., air data probe 12). The identification of the air data probe can be a model number of the probe, a serial number of the probe, an aircraft tail number, type, or manufacturer on which the probe is installed, an identifier of a maintenance procedure for the air data probe and/or aircraft on which the probe is installed, or any other identifier that enables system 10 to uniquely identify the physical dimensions of the air data probe.

An indication is provided of a relative orientation of a camera and the air data probe to be inspected (Step 46). For instance, an inspection procedure for air data probe 12 implemented by inspection device 14 can specify multiple different orientations (or views) of captured images of air data probe 12 for the image-based analysis to identify physical degradation. Such relative orientations (or views) can include, e.g., a top view, a bottom view, a side view, a front view, or other relative orientations. Inspection device 14 can identify, such as via a visual prompt at a GUI presented at display 20, a relative orientation of air data probe 12 and camera 18 for the inspection (e.g., a top view).

Figure 3A:
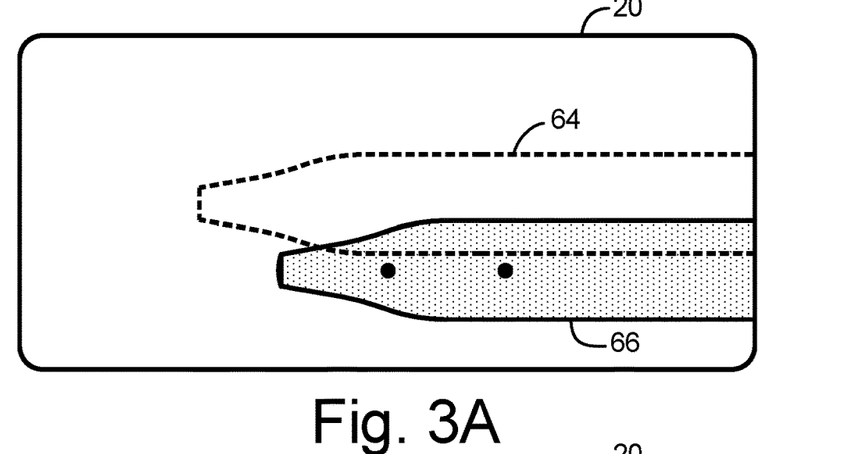
FIGS. 3A-3C are example diagrams illustrating a displayed image of an air data probe being adjusted to conform to a displayed silhouette of the air data probe.
Figure 3B:
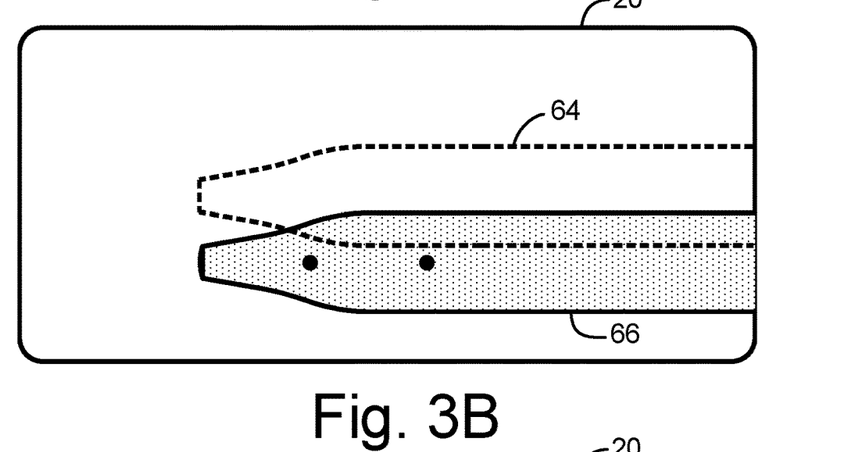
Figure 3C:
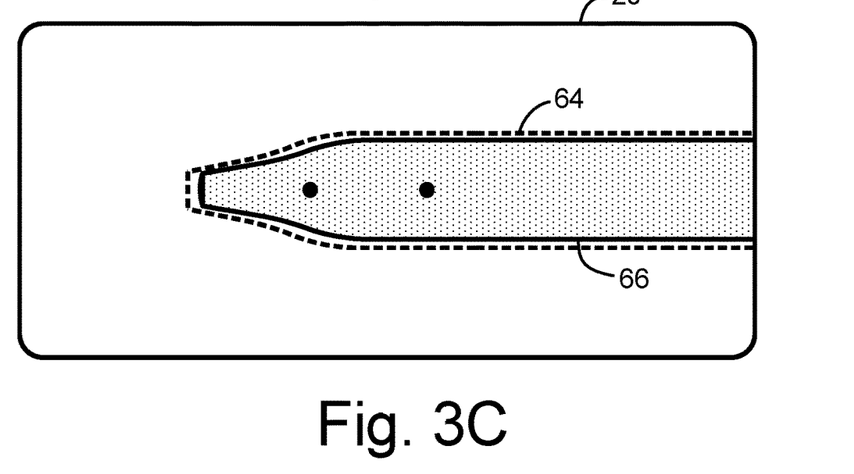

A silhouette of the air data probe is generated (Step 48). For instance, as shown in FIGS. 3A-3C, inspection device 14 can generate silhouette 64 of at least a portion of air data probe 12. The silhouette can be an outline of at least a portion of air data probe 12, a profile of at least a portion of air data probe 12, a so-called "ghosted image" of at least a portion of air data probe 12 (i.e., a visible image of at least a portion of air data probe 12 having less than full opacity), or other graphical representation of at least a portion of air data probe 12. The silhouette is generated base on the identifier of the air data probe. For example, inspection device 14 can provide the identifier of air data probe 12 to server 16, which retrieves physical dimension data and/or the silhouette of air data probe 12 stored at database 30. Server 16 transmits the physical dimension data and/or the silhouette of air data probe 12 to inspection device 14, which generates the silhouette based on the physical dimension data or utilizes the received silhouette of air data probe 12 for display. In some examples, one or more of server 16 and inspection device 14 can verify accuracy of the physical dimension data and/or authenticity of a source of the physical dimension data. For instance, one or more of server 16 and inspection device 14 can verify that the physical dimension data was provided by, authorized by, or is otherwise associated with an authorized provider, such as an original equipment manufacturer (OEM) of the air data probe.

The silhouette and an image of the air data probe produced by a camera are simultaneously displayed on a display device (Step 50). For example, as shown in FIGS. 3A-3C, image 66 of air data probe 12 and silhouette 64 are simultaneously displayed on display 20. Silhouette 64 is displayed as a graphical overlay of a field of view of camera 18 displayed on display 20. When air data probe 12 is within the field of view of camera 18, image 66 of air data probe 12 and silhouette 64 are simultaneously displayed on display 20.

Though silhouette 64 is illustrated in FIGS. 3A-3C as a dashed outline, it should be understood that silhouette 64 can be graphically presented as a solid outline, a dotted outline, a solid but non-opaque image, a colored image or outline, or any other graphical representation of silhouette 64 that enables a user to visually differentiate silhouette 64 and image 66 of air data probe 12 for aligning or otherwise conforming image 66 with silhouette 64.

The displayed image of the air data probe is caused to conform to the silhouette on the display (Step 52). For example, FIGS. 3A-3C show, in combination, an example of image 66 of air data probe 12 being conformed to silhouette 64.

FIG. 3A shows an example of image 66 and silhouette 64 simultaneously displayed on display 20 with a nonconforming relative location of image 66 and silhouette 64, and a nonconforming relative size of image 66 and silhouette 64. That is, in the example of FIG. 3A, image 66 of air data probe 12 is located generally below silhouette 64 on display 20, and a size of image 66 is generally smaller than a size of silhouette 64.

FIG. 3B shows an example of image 66 and silhouette 64 simultaneously displayed on display 20 with a conforming relative size of image 66 and silhouette 64, and a nonconforming relative location of image 66 and silhouette 64. That is, in the example of FIG. 3B, the size of image 66 of air data probe 12 on display 20 is increased (relative to the size of image 66 on FIG. 3A) via one or more of relative movement of camera 18 and air data probe 12 or modification of the field of the field of view of camera 18 (e.g., moving camera 18 closer to air data probe 12 or modifying the field of view of camera 18 by zooming in, such that a portion of the field of view of camera 18 occupied by air data probe 12 increases).

FIG. 3C shows an example of image 66 and silhouette 64 simultaneously displayed on display 20 with image 66 conforming to silhouette 64. That is, in the example of FIG. 3C, both the size and relative location of image 66 and silhouette 64 conform on display 20. While image 66 is illustrated in FIG. 3C as generally within an interior of silhouette 64 for purposes of clarity and ease of illustration, it should be understood that image 66 and silhouette 64 can be considered as conforming when outer boundaries of image 66 are within a threshold distance of silhouette 64 on display 20 around the periphery of image 66, such as a threshold distance of five percent of a width and/or length of image 66, or other threshold distances. Image 66 can therefore be considered as conforming to silhouette 64 when image 66 is displayed entirely within silhouette 64, entirely outside of silhouette 64, overlapping with silhouette 64, or both within and outside of silhouette 64 when outer boundaries of image 66 are within the threshold distance of silhouette 64. Image 66 can be caused to conform with silhouette 64 via relative movement of camera 18 and air data probe 12 and/or modification of a field of view of camera 18 (e.g., zooming the field of view in or out).

The operations of the examples of FIGS. 3A-3C can, in certain examples, be performed in combination with image stabilization operations (optical stabilization, digital image stabilization, or other image stabilization operations) performed by camera 18. For instance, camera 18 can utilize image stabilization operations to stabilize or otherwise reduce movement of image 66 on display 20 while image 66 is conformed with silhouette 64 on display 20 (e.g., via movement of camera 18).

An image of the air data probe is captured while the displayed image of the air data probe conforms to the silhouette of the display (Step 54). For example image 66 of air data probe 12 can be captured by camera 18 when image 66 conforms to silhouette 64 on display 20, as shown in FIG. 3C.

It is determined whether additional images are to be captured for inspection of the air data probe (Step 56). For example, inspection device 14, implementing an inspection procedure of air data probe 12, can identify that multiple images of air data probe 12 are to be captured for the image-based analysis and identification of physical degradation of air data probe 12. The multiple images can be captured from the same or different relative orientations of air data probe 12 and camera 18.

In examples where it is determined that additional images are to be captured for inspection of the air data probe ("YES" branch of Step 56), an indication is provided of a relative orientation of a camera and the air data probe to be inspected (Step 46). The relative orientation can, in certain examples, be different than any one or more previous relative orientations. For instance, inspection device 14 can indicate a first relative orientation of camera 18 and air data probe 12 (e.g., a top view) in a first iteration of Step 46, and can indicate a second relative orientation of camera 18 and air data probe 12 that is different than the first relative orientation (e.g., a bottom view) during a subsequent iteration of Step 46, and can proceed through Steps 48, 50, 52, 54, and 56 accordingly. Inspection device 14 can capture multiple images of air data probe 12 using multiple relative orientations (e.g., views) of camera 18 and air data probe 12.

In examples where it is determined that no additional images are to be captured for inspection of the air data probe ("NO" branch of Step 56), the captured image or images are analyzed to identify physical degradation of the air data probe (Step 58). For example, physical degradation analysis module 28 of inspection device 14 can analyze one or more of the captured images of air data probe 12 to identify physical degradation of air data probe 12.

Figure 4A:
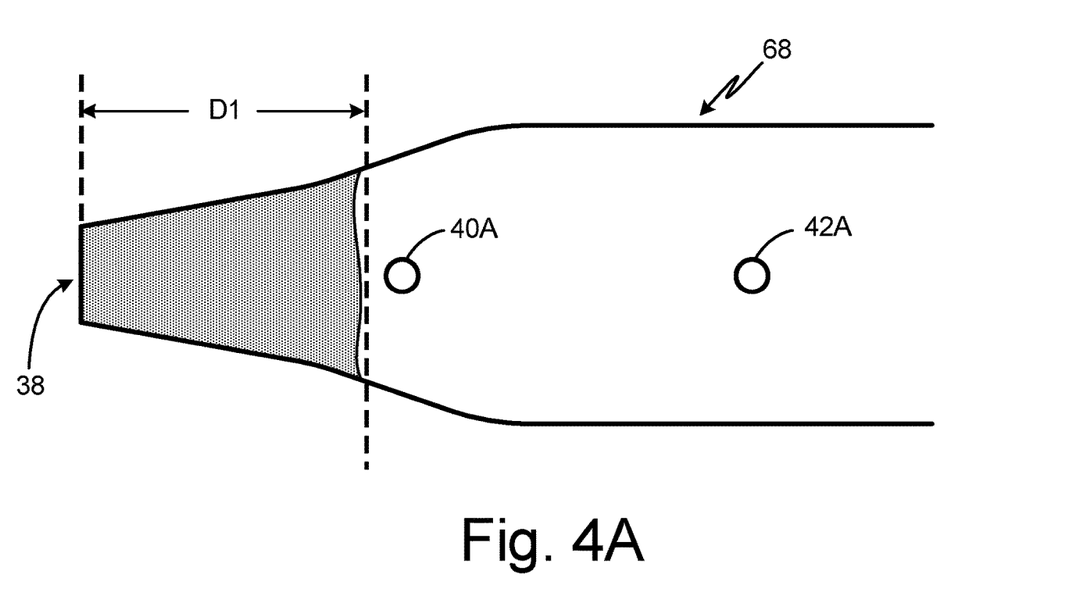
FIG. 4A is a top view of the air data probe illustrating an example of corrosion on a top surface of the exterior of the air data probe.
Figure 4B:
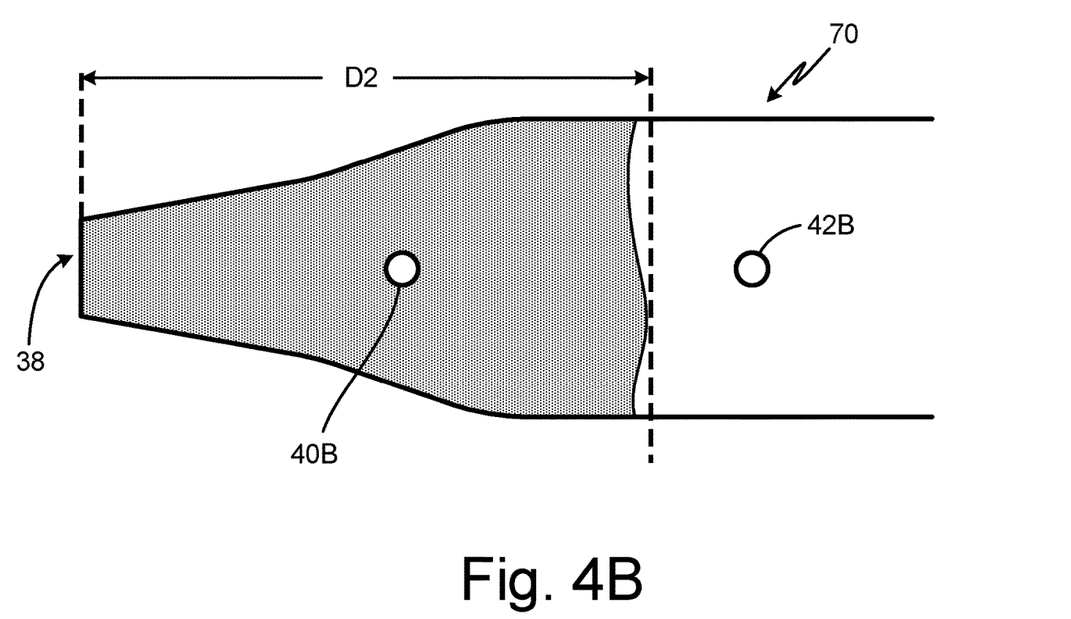
FIG. 4B is a top view of the air data probe illustrating an example of corrosion on a bottom surface of the exterior of the air data probe.
Figure 5:
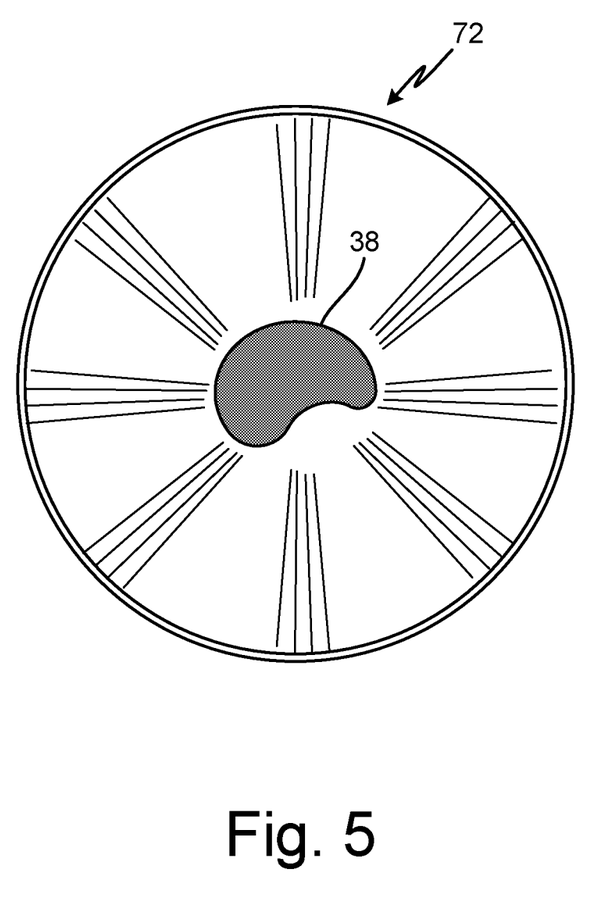
FIG. 5 is a front view of the air data probe illustrating deformation of a total pressure sensing port at a tip of the air data probe.

Physical degradation can take the form of, e.g., corrosion on a surface of air data probe 12 and/or physical deformation of air data probe 12 that can affect accuracy of air data measurements, such as physical deformation of the body of air data probe 12 (e.g., scratches, dents, bends, or other physical deformation of the body of air data probe 12), and/or physical deformation of one or more of pitot pressure port 38 and static pressure ports 40A and 42A. FIGS. 4A and 4B illustrate example images of corrosion on a surface of air data probe 12 that can result from, e.g., environmental exposure during operation on an aircraft. FIG. 5 illustrates an example image of physical deformation of pitot pressure port 38 of air data probe 12 that can result from physical force applied to the port during operation or during maintenance activities, though deformation of static pressure ports or other pressure ports is also possible.

As shown in FIG. 4A, physical degradation analysis module 28 can analyze captured image 68 of air data probe 12 to identify the presence, location, and/or degree of corrosion on air data probe 12. Image 68, in the example of FIG. 4A, is a captured image of air data probe 12 from a top view showing corrosion on a surface of air data probe 12 as a shaded region extending by a distance D1 aft from pitot pressure port 38 at a tip of air data probe 12 toward static pressure ports 40A and 42A.

Corrosion on the surface of air data probe 12 can visually manifest as a change in one or more of shade, color, contrast, and surface pattern of air data probe 12. For instance, corrosion can visually appear as a darkening of the surface of air data probe 12 (i.e., a change in contrast). In other examples, corrosion can visually appear as a change in color or shade in color of the metallic surface of air data probe 12. In certain examples, corrosion can visually appear as a change in surface pattern (or texture) from smooth (i.e., non-corroded) to rough (i.e., corroded) resulting from pitting, flaking, or other surface pattern change associated with corrosion of the metal surface of air data probe 12.

Physical degradation analysis module 28 can analyze image 68 to identify the presence of corrosion on the surface of air data probe 12, including any surface of air data probe 12 visible within a field of view of camera 18 (e.g., an outer surface of air data probe 12, a surface within an interior of pitot pressure port 38, or other surface within a field of view of camera 18). For instance, physical degradation analysis module 28 can identify edges corresponding to transitions of contrast, shade, color, and surface pattern using, e.g., one or more of the Sobel, Canny, Prewitt, Roberts, fuzzy logic, or other edge detection methods. Physical degradation analysis module 28 can identify the presence of corrosion in response to identifying edges corresponding to a transition of contrast, shade, color, and surface pattern that exceed a threshold magnitude of change. Physical degradation analysis module 28, in some examples, identifies a degree of identified corrosion based on a magnitude of change of one or more of the contrast, shade, color, and surface pattern across the identified edges, an increased magnitude of change corresponding to a greater degree of corrosion (a decreased magnitude of change corresponding to a lesser degree of corrosion).

Physical degradation analysis module 28, in some examples, identifies one or more locations of corrosion on the surface of air data probe 12 as those locations bounded by edges corresponding to transitions in one or more of the contrast, shade, color, and surface pattern. For instance, physical degradation analysis module 28 can identify a location of corrosion as a location bounded by identified edges in image 68 corresponding to transitions between dark and light, the darker region corresponding to the location of corrosion. In certain examples, physical degradation analysis module 28 can identify a location of corrosion as a location bounded by identified edges in image 68 corresponding to transitions between a rough surface pattern and a smooth surface pattern, the rougher surface pattern corresponding to the location of corrosion.

In the example of FIG. 4A, physical degradation analysis module 28 identifies an edge (e.g., a curvilinear edge) corresponding to a transition between one or more of contrast, shade, color, and surface pattern in image 68 and identifies the location as extending aft from the forward tip of air data probe 12 (i.e., at pitot pressure port 38) by distance D1. Physical degradation analysis module 28, as in the example of FIG. 4A, can identify the distance D1 as a distance between the forward tip and an aft-most portion of the identified edge of corrosion, though in other examples the distance D1 can be determined as an average distance from the forward tip to the identified curvilinear edge of corrosion, or other distances. Accordingly, in the example of FIG. 4A, physical degradation analysis module 28 identifies the presence of corrosion on a surface of air data probe 28 at a location extending from the forward tip of air data probe 12 to a location that is a distance D1 in a direction aft of the forward tip.

In some examples, physical degradation analysis module 28 can identify the presence and location of corrosion on the surface of air data probe 12 in multiple images of air data probe 12 captured from multiple relative orientations of air data probe 12 and camera 18. For example, FIG. 4B shows an example of image 70 that is a captured image of air data probe 12 from a bottom view showing corrosion on a surface of air data probe 12 as a shaded region extending by a distance D2 aft from pitot pressure port 38 at a tip of air data probe 12 toward static pressure ports 40B and 42B. That is, image 70 of FIG. 4B shows a bottom view of air data probe 12 including static pressure port 40B opposite static pressure port 40A (FIG. 4A) and static pressure port 42B opposite static pressure port 42A (FIG. 4A).

In the example of FIG. 4B, physical degradation analysis module 28 identifies a location of corrosion on the surface of air data probe 12 at a location extending from the forward tip of air data probe 12 to a location that is a distance D2 in a direction aft of the forward tip. Physical degradation analysis module 28 can compare distance D1 (FIG. 4A) and distance D2 to identify asymmetry of corrosion on air data probe 12 for use in generating a maintenance recommendation for air data probe 12, as is further described below. For example, physical degradation analysis module 28 can compare a difference between distances D1 and D2 to a threshold value corresponding to threshold corrosion asymmetry criteria. Physical degradation analysis module 28 can determine that the identified corrosion on the surface of air data probe 12 does not satisfy the threshold corrosion asymmetry criteria in response to determining that the difference between distances D1 and D2 exceeds the threshold value associated with the corrosion asymmetry criteria.

In some examples, physical degradation analysis module 28 identifies physical degradation of air data probe 12 resulting from physical deformation of one or more of pitot pressure port 38 and static pressure ports 40A, 40B, 42A, and 42B. For example, FIG. 5 shows image 72, which is a captured image of air data probe 12 from a front view (i.e., orthogonal to pitot pressure port 38) and showing physical deformation of pitot pressure port 38 as a deviation from a known, circular profile.

Physical degradation analysis module 28 can analyze image 72 to identify the physical deformation of pitot pressure port 38, such as by comparing an outer profile of pitot pressure port 38 in image 72 (e.g., a shape of a circumference of pitot pressure port 38 in image 72) to known dimensions of the outer profile of pitot pressure port 38 retrieved from, e.g., database 30 via server 16. Physical degradation analysis module 28 can identify physical degradation of air data probe 12 corresponding to the physical deformation of pitot pressure port 38 in response to determining that the outer profile of pitot pressure port 38 in image 72 deviates from the known outer profile of pitot pressure port 38 by a threshold deviation, such as a threshold deviation of aspect ratio, a threshold deviation of circularity, a threshold deviation of elongation shape factor, or other threshold deviations.

While FIG. 5 shows an example in which pitot pressure port 38 deviates from a known, circular profile, it should be understood that other known profiles (and deviations therefrom) are contemplated, such as an elliptical or other known profile of pitot pressure port 38. In addition, it should be understood that the techniques described herein with respect to FIG. 5 are applicable to the identification of physical deformation of other pressure ports having circular or non-circular outer profiles, such as any one or more of static pressure ports 40A, 40B, 42A, and 42B. Moreover, while the example of FIG. 5 describes techniques in which physical deformation of pitot pressure port 38 is identified via a front view of air data probe 12 (i.e., orthogonal to pitot pressure port 38), it should be understood that corrosion or other surface wear visible within the field of view of camera 18, such as within the interior of pitot pressure port 38 and visible within the field of view of camera 18 in the front view, can be identified from the image captured in the front view.

As shown in FIG. 2, a maintenance recommendation for the air data probe is generated based on the identified physical degradation of the air data probe (Step 60). For instance, physical degradation analysis module 28 can generate a maintenance recommendation for air data probe 12 based on physical degradation of air data probe 12 (e.g., corrosion and/or physical deformation) identified using the captured images of air data probe 12. Physical degradation analysis module 28 can generate the maintenance recommendation for air data probe 12 based on a comparison of identified physical degradation with one or more physical degradation criteria. For instance, physical degradation module 28 can compare a determined degree of corrosion with one or more threshold corrosion criteria, such as a threshold magnitude of change of one or more of shade, color, contrast, and surface pattern in a captured image, and can determine that air data probe 12 does not satisfy the one or more physical degradation criteria in response to determining that the determined degree of corrosion exceeds the threshold corrosion criteria. Physical degradation module 28, in certain examples, can determine that air data probe 12 does not satisfy the one or more physical degradation criteria in response to determining that identified asymmetry of corrosion of air data probe 12 exceeds one or more threshold corrosion asymmetry criteria. In some examples, physical degradation module 28 determines that air data probe 12 does not satisfy the one or more physical degradation criteria in response to identifying that an outer profile of any one or more of pitot pressure port 38 and static pressure ports 40A, 40B, 42A, and 42B deviates from a defined outer profile of the respective port by a threshold deviation.

Physical degradation module 38 generates a maintenance recommendation based on the comparison of the identified physical degradation of air data probe 12 with the one or more physical degradation criteria. Examples of maintenance recommendations can include, e.g., a recommendation that physical degradation of air data probe 12 is not present or does not exceed the threshold physical degradation criteria, a recommendation for further inspection of air data probe 12, a recommendation for repair of air data probe 12, a recommendation for replacement of air data probe 12, or other maintenance recommendations.

The maintenance recommendation is output (Step 62). For example, inspection device 14 can output the maintenance recommendation by displaying the recommendation at display 20. In some examples, inspection device 14 can output the maintenance recommendation to a remote computing device, such as a maintenance computer or other device, via communication device(s) 24. The maintenance technician or other user can thereafter clear air data probe 12 for service, conduct further inspection (e.g., manual inspection or other further inspection), remove air data probe 12 for repair, and/or replace air data probe 12 on the aircraft based at least in part on the provided maintenance recommendation.

Accordingly, system 10 implementing techniques of this disclosure can produce a maintenance recommendation for an air data probe based on image analysis to enable greater uniformity of the application of physical degradation criteria. The techniques of this disclosure can therefore increase predictability of inspection operations, thereby enhancing the overall quality of inspections and resulting in increased customer satisfaction.

Discussion of Possible Embodiments

The following are non-exclusive descriptions of possible embodiments of the present invention.

A method of inspecting an air data probe for physical degradation includes providing an identification of the air data probe to be inspected. The method further includes generating a silhouette of the air data probe based on the identification and simultaneously displaying, on a display, the silhouette and an image of the air data probe produced by a camera. The method further includes causing the displayed image of the air data probe to conform to the silhouette on the display, capturing an image of the air data probe while the displayed image of the air data probe conforms to the silhouette on the display, and analyzing the captured image to identify physical degradation of the air data probe. The method further includes generating, based on the identified physical degradation of the air data probe, a maintenance recommendation for the air data probe, and outputting the maintenance recommendation.

The method of the preceding paragraph can optionally include, additionally and/or alternatively, any one or more of the following features, configurations, operations, and/or additional components:

Analyzing the captured image to identify the physical degradation of the air data probe can include analyzing the captured image to identify corrosion on a surface of the air data probe.

Analyzing the captured image to identify the corrosion on the surface of the air data probe can include analyzing the captured image to identify a location of the corrosion on the surface of the air data probe based on a transition of one or more of shade, color, contrast, and surface pattern in the captured image.

Analyzing the captured image to identify the location of the corrosion based on the transition of the one or more of the shade, color, contrast, and surface pattern in the captured image can include identifying the transition of the one or more of the shade, color, contrast, and surface pattern in the captured image using an edge detection algorithm.

The method can further include identifying a degree of the corrosion on the surface of the air data probe based on a magnitude of the transition of the one or more of the shade, the color, the contrast, and the surface pattern in the captured image. Generating the maintenance recommendation for the air data probe can include generating the maintenance recommendation based on a comparison of the degree of the corrosion to one or more threshold corrosion degree criteria.

Capturing the image of the air data probe while the air data probe conforms to the silhouette on the display can include capturing a first image of the air data probe in a first relative orientation of the air data probe and the camera. Analyzing the captured image to identify the location of the corrosion on the surface of the air data probe can include analyzing the first captured image to determine a first location of the corrosion in the first relative orientation of the air data probe and the camera. The method can further include: causing the displayed image of the air data probe to conform to the silhouette on the display in a second relative orientation of the air data probe and the camera that is different than the first relative orientation; capturing a second image of the air data probe while the displayed image of the air data probe conforms to the silhouette on the display in the second relative orientation; analyzing the second captured image to identify a second location of the corrosion in the second relative orientation based on a transition of one or more of shade, color, contrast, and surface pattern in the second captured image; and comparing the first location of the corrosion and the second location of the corrosion. Generating the maintenance recommendation for the air data probe can include generating the maintenance recommendation for the air data probe based on the comparing of the location of the corrosion and the second location of the corrosion.

The air data probe can include a pitot tube having a barrel portion extending from a forward tip to an aft end of the pitot tube. Analyzing the first captured image to determine the first location of the corrosion in the first relative orientation of the air data probe and the camera can include analyzing the first captured image to determine the first location of the corrosion relative to the forward tip of the pitot tube. Analyzing the second captured image to determine the second location of the corrosion in the second relative orientation of the air data probe and the camera can include analyzing the second captured image to determine the second location of the corrosion relative to the forward tip of the pitot tube.

The air data probe can include an air data sensing port. Analyzing the captured image to identify the physical degradation of the air data probe can include analyzing the captured image to identify physical deformation of the air data sensing port.

The air data probe can include a pitot tube having a barrel portion extending from a forward tip to an aft end of the pitot tube. The air data sensing port can include a pitot pressure port at the forward tip of the pitot tube. Analyzing the captured image to identify the physical deformation of the air data sensing port can include analyzing the captured image to identify physical deformation of the pitot pressure port.

The air data probe can include a pitot-static tube having a barrel portion extending from a forward tip to an aft end of the pitot-static tube. The air data sensing port can include a static pressure port located in the barrel portion aft of the forward tip. Analyzing the captured image to identify the physical deformation of the air data sensing port can include analyzing the captured image to identify physical deformation of the static pressure port.

Causing the displayed image of the air data probe to conform to the silhouette on the display can include adjusting at least one of a relative location, a relative orientation, and a relative size of the displayed image of the air data probe and the silhouette so that the displayed image of the air data probe conforms to the silhouette on the display.

Adjusting the at least one of the relative location, the relative orientation, and the relative size of the displayed image of the air data probe and the silhouette can include moving at least one of the camera and the air data probe.

Generating the silhouette of the air data probe based on the identification can include: accessing a database that stores physical dimensions of the air data probe corresponding to the identification of the air data probe to retrieve the physical dimensions of the air data probe; and generating the silhouette of the air data probe based on the retrieved physical dimensions.

The silhouette can include an outline of a periphery of at least a portion of the air data probe.

The maintenance recommendation for the air data probe can include one of a recommendation for further inspection of the air data probe, a recommendation for repair of the air data probe, and a recommendation for replacement of the air data probe.

The simultaneously displaying, on the display, the silhouette and the image of the air data probe produced by the camera, the causing the displayed image of the air data probe to conform to the silhouette on the display, and the capturing the image of the air data probe while the displayed image of the air data probe conforms to the silhouette on the display can be performed while the air data probe is mounted on an aircraft.

A system for inspecting an air data probe for physical degradation includes a camera, a display device, one or more processors, and computer-readable memory. The computer-readable memory is encoded with instructions that, when executed by the one or more processors, cause the system to generate a silhouette of the air data probe and simultaneously display, on the display device, the silhouette and an image of the air data probe produced by the camera. The computer-readable memory is further encoded with instructions that, when executed by the one or more processors, cause the system to capture an image of the air data probe while the displayed image of the air data probe conforms to the silhouette on the display device, and analyze the captured image to identify physical degradation of the air data probe. The computer-readable memory is further encoded with instructions that, when executed by the one or more processors, cause the system to generate, based on the identified physical degradation of the air data probe, a maintenance recommendation for the air data probe, and output the maintenance recommendation.

The system of the preceding paragraph can optionally include, additionally and/or alternatively, any one or more of the following features, configurations, operations, and/or additional components:

The computer-readable memory can be further encoded with instructions that, when executed by the one or more processors, cause the system to analyze the captured image to identify physical degradation of the air data probe by analyzing the captured image to identify a location of corrosion on a surface of the air data probe based on a transition of one or more of shade, color, contrast, and surface pattern in the captured image.

The computer-readable memory can be further encoded with instructions that, when executed by the one or more processors, cause the system to analyze the captured image to identify physical degradation of the air data probe by analyzing the captured image to identify physical deformation of an air data sensing port of the air data probe.

The computer-readable memory can be further encoded with instructions that, when executed by the one or more processors, cause the system to generate the silhouette of the air data probe as an outline of a periphery of at least a portion of the air data probe.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of inspecting an air data probe for physical degradation, the method comprising:
   providing an identification of the air data probe to be inspected;

generating a silhouette of the air data probe based on the identification, the silhouette comprising an outline of a periphery of at least a portion of the air data probe;

simultaneously displaying, on a display, the silhouette and an image of the air data probe produced by a camera, the silhouette displayed as a graphical overlay on the image of the air data probe;

causing the displayed image of the air data probe to conform to the silhouette on the display by adjusting at least one of a relative location, a relative orientation, and a relative size of the displayed image of the air data probe and the silhouette so that the displayed image of the air data probe conforms to the silhouette on the display;

capturing an image of the air data probe while the displayed image of the air data probe conforms to the silhouette on the display;

analyzing the captured image to identify physical degradation of the air data probe;

generating, based on the identified physical degradation of the air data probe, a maintenance recommendation for the air data probe; and outputting the maintenance recommendation.

2. The method of claim 1,
wherein analyzing the captured image to identify the physical degradation of the air data probe comprises analyzing the captured image to identify corrosion on a surface of the air data probe.

3. The method of claim 2,
wherein analyzing the captured image to identify the corrosion on the surface of the air data probe comprises analyzing the captured image to identify a location of the corrosion on the surface of the air data probe based on a transition of one or more of shade, color, contrast, and surface pattern in the captured image.

4. The method of claim 3,
wherein analyzing the captured image to identify the location of the corrosion based on the transition of the one or more of the shade, color, contrast, and surface pattern in the captured image comprises identifying the transition of the one or more of the shade, color, contrast, and surface pattern in the captured image using an edge detection algorithm.

5. The method of claim 3, further comprising:
identifying a degree of the corrosion on the surface of the air data probe based on a magnitude of the transition of the one or more of the shade, the color, the contrast, and the surface pattern in the captured image;

wherein generating the maintenance recommendation for the air data probe comprises generating the maintenance recommendation based on a comparison of the degree of the corrosion to one or more threshold corrosion degree criteria.

6. The method of claim 3, wherein capturing the image of the air data probe while the air data probe conforms to the silhouette on the display comprises capturing a first image of the air data probe in a first relative orientation of the air data probe and the camera, and wherein analyzing the captured image to identify the location of the corrosion on the surface of the air data probe comprises analyzing the first captured image to determine a first location of the corrosion in the first relative orientation of the air data probe and the camera, the method further comprising:

causing the displayed image of the air data probe to conform to the silhouette on the display in a second relative orientation of the air data probe and the camera that is different than the first relative orientation;

capturing a second image of the air data probe while the displayed image of the air data probe conforms to the silhouette on the display in the second relative orientation;

analyzing the second captured image to identify a second location of the corrosion in the second relative orientation based on a transition of one or more of shade, color, contrast, and surface pattern in the second captured image; and comparing the first location of the corrosion and the second location of the corrosion;

wherein generating the maintenance recommendation for the air data probe comprises generating the maintenance recommendation for the air data probe based on the comparing of the location of the corrosion and the second location of the corrosion.

7. The method of claim 6,
wherein the air data probe comprises a pitot tube having a barrel portion extending from a forward tip to an aft end of the pitot tube;

wherein analyzing the first captured image to determine the first location of the corrosion in the first relative orientation of the air data probe and the camera comprises analyzing the first captured image to determine the first location of the corrosion relative to the forward tip of the pitot tube; and wherein analyzing the second captured image to determine the second location of the corrosion in the second relative orientation of the air data probe and the camera comprises analyzing the second captured image to determine the second location of the corrosion relative to the forward tip of the pitot tube.

8. The method of claim 1,
wherein the air data probe includes an air data sensing port; and wherein analyzing the captured image to identify the physical degradation of the air data probe comprises analyzing the captured image to identify physical deformation of the air data sensing port.

9. The method of claim 8,
wherein the air data probe comprises a pitot tube having a barrel portion extending from a forward tip to an aft end of the pitot tube;

wherein the air data sensing port comprises a pitot pressure port at the forward tip of the pitot tube; and wherein analyzing the captured image to identify the physical deformation of the air data sensing port comprises analyzing the captured image to identify physical deformation of the pitot pressure port.

10. The method of claim 8,
wherein the air data probe comprises a pitot-static tube having a barrel portion extending from a forward tip to an aft end of the pitot-static tube;

wherein the air data sensing port comprises a static pressure port located in the barrel portion aft of the forward tip; and wherein analyzing the captured image to identify the physical deformation of the air data sensing port comprises analyzing the captured image to identify physical deformation of the static pressure port.

11. The method of claim 1,
wherein adjusting the at least one of the relative location, the relative orientation, and the relative size of the displayed image of the air data probe and the silhouette comprises moving at least one of the camera and the air data probe.

12. The method of claim 1,
wherein generating the silhouette of the air data probe based on the identification comprises:
accessing a database that stores physical dimensions of the air data probe corresponding to the identification of the air data probe to retrieve the physical dimensions of the air data probe; and
generating the silhouette of the air data probe based on the retrieved physical dimensions.

13. The method of claim 1,
wherein the maintenance recommendation for the air data probe comprises one of a recommendation for further inspection of the air data probe, a recommendation for repair of the air data probe, and a recommendation for replacement of the air data probe.

14. The method of claim 1,
wherein the simultaneously displaying, on the display, the silhouette and the image of the air data probe produced by the camera, the causing the displayed image of the air data probe to conform to the silhouette on the display, and the capturing the image of the air data probe while the displayed image of the air data probe conforms to the silhouette on the display are performed while the air data probe is mounted on an aircraft.

15. A system for inspecting an air data probe for physical degradation, the system comprising: a camera;
a display device; one or more processors; and computer-readable memory encoded with instructions that, when executed by the one or more processors, cause the system to:
generate a silhouette of the air data probe, the silhouette comprising an outline of a periphery of at least a portion of the air data probe; simultaneously display, on the display device, the silhouette and an image of the air data probe produced by the camera, the silhouette displayed as a graphical overlay on the image of the air data probe; and the silhouette so that the displayed image of the air data probe conforms to the silhouette on the display; capture an image of the air data probe while the displayed image of the air data probe conforms to the silhouette on the display device after adjustment of at least one of a relative location, a relative orientation, and a relative size of the displayed image of the air data probe and the silhouette so that the displayed image of the air data probe conforms to the silhouette on the display; analyze the captured image to identify physical degradation of the air data probe; generate, based on the identified physical degradation of the air data probe, a maintenance recommendation for the air data probe; and output the maintenance recommendation.

16. The system of claim 15,
wherein the computer-readable memory is further encoded with instructions that, when executed by the one or more processors, cause the system to analyze the captured image to identify physical degradation of the air data probe by analyzing the captured image to identify a location of corrosion on a surface of the air data probe based on a transition of one or more of shade, color, contrast, and surface pattern in the captured image.

17. The system of claim 15,
wherein the computer-readable memory is further encoded with instructions that, when executed by the one or more processors, cause the system to analyze the captured image to identify physical degradation of the air data probe by analyzing the captured image to identify physical deformation of an air data sensing port of the air data probe.

* * * * *